(12) United States Patent
Gao

(10) Patent No.: US 12,469,900 B2
(45) Date of Patent: Nov. 11, 2025

(54) BATTERY MODULE, BATTERY MODULE ASSEMBLY, PRODUCTION METHOD THEREFOR AND APPARATUS

(71) Applicant: CONTEMPORARY AMPEREX TECHNOLOGY (HONG KONG) LIMITED, Hong Kong (CN)

(72) Inventor: Hanqing Gao, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 818 days.

(21) Appl. No.: 17/746,905

(22) Filed: May 17, 2022

(65) Prior Publication Data
US 2022/0278391 A1  Sep. 1, 2022

Related U.S. Application Data

(63) Continuation of application No. PCT/CN2020/091520, filed on May 21, 2020.

(51) Int. Cl.
*H01M 10/6556* (2014.01)
*H01M 10/613* (2014.01)
*H01M 10/625* (2014.01)
*H01M 10/653* (2014.01)

(52) U.S. Cl.
CPC ..... *H01M 10/6556* (2015.04); *H01M 10/613* (2015.04); *H01M 10/625* (2015.04); *H01M 10/653* (2015.04); *H01M 2220/20* (2013.01)

(58) Field of Classification Search
CPC ........... H01M 10/6556; H01M 10/613; H01M 10/625; H01M 10/653; H01M 2220/20; H01M 10/6567; H01M 10/658; Y02E 60/10
See application file for complete search history.

(56) References Cited

U.S. PATENT DOCUMENTS

| | | | |
|---|---|---|---|
| 2013/0022859 A1 | 1/2013 | Lim | |
| 2018/0138565 A1* | 5/2018 | Lee | H01M 10/6554 |
| 2019/0280355 A1* | 9/2019 | Kim | H01M 10/658 |

FOREIGN PATENT DOCUMENTS

| | | |
|---|---|---|
| CN | 107534196 A | 1/2018 |
| CN | 108370075 A | 8/2018 |
| CN | 108701791 A | 10/2018 |
| CN | 108780934 A | 11/2018 |
| CN | 208538976 U | 2/2019 |
| CN | 110246997 A | 9/2019 |
| CN | 209447881 U | 9/2019 |
| CN | 209747688 U | 12/2019 |
| CN | 210006806 U | 1/2020 |
| CN | 111029505 A | 4/2020 |
| CN | 111048868 A | 4/2020 |
| EP | 3343691 A1 | 7/2018 |
| WO | 2018135756 A1 | 7/2018 |

OTHER PUBLICATIONS

The Grant Notification for European Application No. 20936805.9, dated Mar. 4, 2025, 7 pages.
The First Office Action for Chinese Application No. 202080005632.0, dated Aug. 30, 2022, 15 pages.
The Second Office Action for Chinese Application No. 202080005632.0, dated Dec. 14, 2022, 4 pages.
The International search report for PCT Application No. PCT/CN2020/091520, dated Feb. 22, 2021, 13 pages.
The extended European search report for European Application No. 20936805.9, dated Apr. 13, 2023, 6 pages.

* cited by examiner

*Primary Examiner* — Muhammad S Siddiquee
(74) *Attorney, Agent, or Firm* — East IP P.C.

(57) ABSTRACT

A battery module, a battery module assembly and a production method therefor, and an apparatus. The battery module comprises: a battery unit and a housing. The battery unit has a top surface, a bottom surface, and side surfaces connecting the top surface and the bottom surface. The housing accommodates the battery unit. The housing comprises limiting frames and injection channels provided on the limiting frames. The limiting frames are provided around the side surfaces of the battery unit. The bottom of the battery module is configured to form, with a cooling component, an accommodating cavity. The injection channels are configured to be communicated with the accommodating cavity, so as to achieve injection of thermally conductive slurry from the injection channels into the accommodating cavity. The battery module is provided with the injection channels.

17 Claims, 6 Drawing Sheets

BATTERY MODULE, BATTERY MODULE ASSEMBLY, PRODUCTION METHOD THEREFOR AND APPARATUS

CROSS-REFERENCE TO RELATED APPLICATIONS

This application is a continuation of International Application No. PCT/CN2020/091520, filed on May 21, 2020, the contents of which are hereby incorporated by reference in their entireties.

TECHNICAL FIELD

The present disclosure relates to a field of battery technology, and in particular, to a battery module, a battery module assembly, a production method therefor and an apparatus.

BACKGROUND

With a development of science and technology, application fields of a secondary battery is more and more extensive. A capacity required for the secondary battery is becoming larger and larger. As the capacity of the secondary battery increases, technology for efficiently cooling heat generated in the secondary battery is also rapidly developing.

The battery module assembly includes a battery module and a cooling component. Usually, thermal adhesive is filled between the battery module and the cooling component to reduce thermal resistance and improve thermal conductivity. In the prior art, thermally conductive slurry is directly spread on the cooling component, and then the battery module is directly placed on the thermally conductive slurry. However, in the battery module assembly manufactured in this way, the battery module has poor heat dissipation performance, which affects a normal use of the battery module.

SUMMARY

Embodiments of the present disclosure provide a battery module, a battery module assembly, a production method therefor and an apparatus. The battery module is provided with an injection channel, and thermally conductive slurry injected into an accommodation cavity between the battery module and a cooling component through the injection channel can fully fill the accommodation cavity, thereby improving a heat dissipation efficiency of the battery module.

In an aspect, an embodiment of the present disclosure provides a battery module, comprising a battery unit and a housing for accommodating the battery module. The battery unit comprises a top surface, a bottom surface, and a side surface connecting the top surface and the bottom surface. The housing comprises a limit frame and an injection channel arranged on the limit frame. The limit frame is arranged around the side surface of the battery unit. An accommodation cavity is formed by a bottom of the battery module and a cooling component. The injection channel is configured to be communicated with the accommodation cavity to allow for an injection of thermally conductive slurry into the accommodation cavity from the injection channel.

In the battery module of the embodiment of the present disclosure, the injection channel is provided on the limit frame around the battery unit. When the battery module is applied to the battery module assembly, the battery module may be pre-assembled with the cooling component and the accommodation cavity is formed between the bottom of the battery module and the cooling part. Then, the thermally conductive slurry is injected into the accommodation cavity via the injection channel on the limit frame. Since the thermally conductive slurry is injected into the accommodation cavity via the injection channel, the thermally conductive slurry can effectively fill each area of the accommodation cavity under the action of the injection pressure. Thus on one hand it is ensured that the bottom surface of the battery module and the surface of the cooling component can be kept in contact with the thermally conductive slurry, so as to reduce the possibility of a gap appearing between the battery module and the thermally conductive slurry or between the cooling component and the thermally conductive slurry, which is beneficial to improve the heat dissipation effect and heat dissipation efficiency of the battery module.

In another aspect, an embodiment of the present disclosure provides a battery module assembly comprising a cooling component and the battery module as described above. The accommodation cavity is provided between a bottom of the battery module and the cooling component. The injection channel is communicated with the accommodation cavity. The injection channel is used for injecting the thermally conductive slurry into the accommodation cavity. The thermally conductive slurry is used for conducting heat of the battery module to the cooling component.

In another aspect, an embodiment of the present disclosure provides a production method for a battery module assembly, comprising:

providing a cooling component;

providing a battery module, wherein the battery module comprises a battery unit and a housing, the housing accommodates the battery unit, the housing comprises a limit frame and an injection channel arranged on the limit frame, and the limit frame is arranged around the side surface of the battery unit;

connecting the battery module to the cooling component, forming an accommodation cavity between a bottom of the battery module and the cooling component, wherein the injection channel is communicated with the accommodation cavity;

injecting the thermally conductive slurry into the accommodation cavity via the injection channel.

In another aspect, an embodiment of the present disclosure provides an apparatus using a battery module as a power source, comprising the battery module as described above.

BRIEF DESCRIPTION OF THE DRAWINGS

Features, advantages, and technical effects of exemplary embodiments of the present disclosure will be described below with reference to the accompanying drawings.

Figure 1:
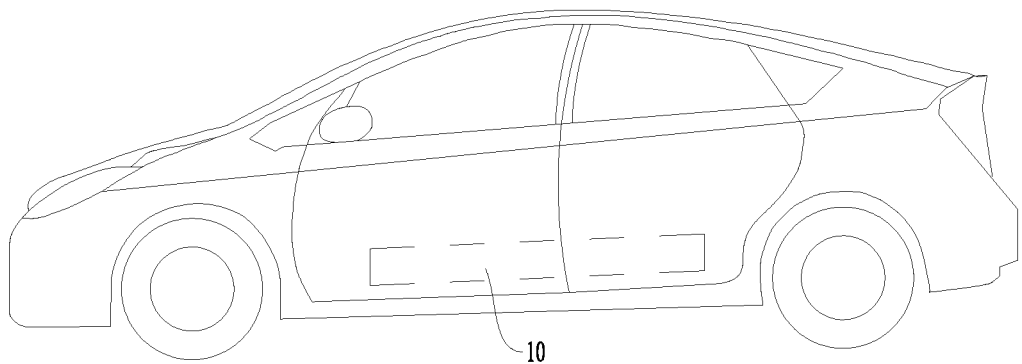
FIG. 1 is a schematic structural diagram of a vehicle disclosed in an embodiment of the present disclosure.

In the drawings, figures are not drawn to actual scale.

DESCRIPTION OF REFERENCE SIGNS 1, vehicle;
10, battery pack; 11, box;
20, battery module;
30, battery unit; 31, secondary battery; 32, bus bar;
40, housing;
50, limit frame; 51, boss;
60, end plate assembly;
61, end plate; 611, body portion; 612, first adapter portion;
62, insulation plate; 621, second adapter portion; 621a, receiving portion; 622, protrusion;
63, connection pipe;
70, side plate assembly;
80, bottom plate;
90, top plate;
100, blocking member;
200, injection channel;
300, discharge channel;
400, cooling component;
500, accommodation cavity;
X, height direction; Y, length direction; Z, width direction.

DETAILED DESCRIPTION

Below, implementing ways of the present disclosure will be further described in detail with reference to accompanying drawings and embodiments. The detailed description of the following embodiments and the accompanying drawings are used to illustrate principles of the present disclosure by way of example, but should not be used to limit the scope of the present disclosure, that is, the present disclosure is not limited to the described embodiments.

In the description of the present disclosure, it should be noted that, unless otherwise stated, the meaning of "a plurality" and the like is two or more; the orientation or position relation indicated by the terms such as "upper", "lower", "left", "right", "inner", "outer" and the like are only used to conveniently describe the present application and simplify the description, not to indicate or imply that the indicated device or element must have a particular orientation, be constructed and operate in a particular orientation and therefore cannot be understood to be a limitation to the present disclosure. Additionally, the terms "first", "second", "third" and the like are used for descriptive purposes only and are not to be construed as indicating or implying relative importance. The term "vertical" is not strictly vertical, but within an allowable range of errors. The term "parallel" is not strictly parallel, but within an allowable range of errors.

Orientation words appearing in the following description are all directions shown in the drawings, and do not limit the specific structure of the present application. In the description of the present disclosure, it should be noted that, unless otherwise stated, the terms "installed", "connected to", "connected with" are to be understood broadly, and may be, for example, a fixed connection, a detachable connection, an integral connection, a direct connection or indirect connection through an intermediate medium. The specific meaning of the above terms in the present disclosure can be understood by those skilled in the art according to actual circumstance.

For a better understanding of the present disclosure, embodiments of the present disclosure are described below with reference to FIGS. 1 to 10.

An embodiment of the present disclosure provides an apparatus using a battery module as a power source. The apparatus can be, but is not limited to, a vehicle, a ship, or an aircraft. Referring to FIG. 1, an embodiment of the present disclosure provides a vehicle 1, which includes a vehicle body and a battery pack 10. The battery pack 10 is provided in the vehicle body. The vehicle 1 may be a pure electric vehicle, a hybrid vehicle or an extended-range vehicle. The vehicle body is provided with a drive motor electrically connected to the battery pack 10. The battery pack 10 supplies power to the drive motor. The drive motor is connected with wheels on the vehicle body via a transmission mechanism, so as to drive the vehicle to travel. Alternatively, the battery pack 10 may be horizontally disposed at a bottom of the vehicle body.

Figure 2:
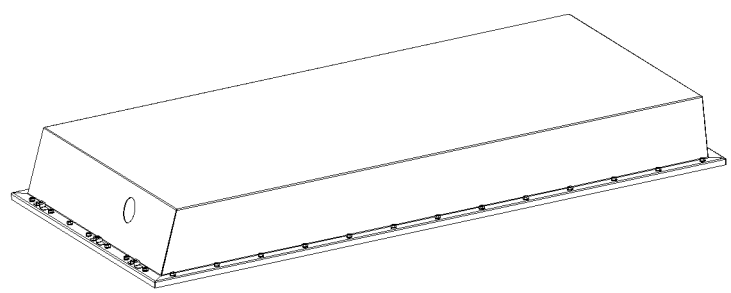
FIG. 2 is a schematic diagram of an exploded structure of a battery pack disclosed in an embodiment of the present disclosure.
Figure 2:
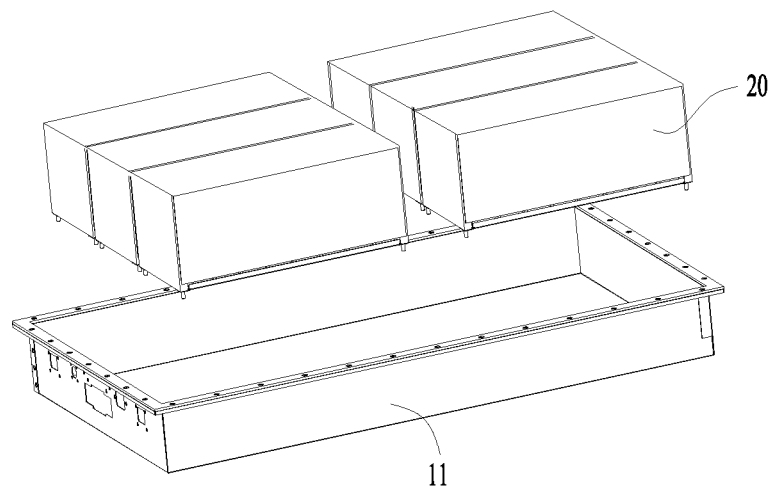

Referring to FIG. 2, the battery pack 10 can be arranged in various ways. In some optional embodiments, the battery pack 10 includes a box 11 and a battery module assembly disposed in the box 11. The number of battery module assemblies is set as one or more. One or more battery module assemblies are arranged in the box 11. The type of the box 11 is not limited. The box 11 may be a frame-shaped box, a disc-shaped box, a case-shaped box, or the like. Optionally, the box 11 includes a lower box for accommodating the battery module assembly and an upper box covering and enclosing the lower box. After the upper box covers and encloses the lower box, an accommodating portion for accommodating the battery module assembly is formed.

After noticing a problem of poor heat dissipation of the battery module, the applicant conducts research and analysis on various structures of the battery module. The applicant found that there is a gap between the battery module and thermally conductive slurry or between a cooling component and the thermally conductive slurry, resulting in a non-contact state at some parts. Thus a thermal resistance of a position where a non-contact area is located is relatively large, which affects a heat dissipation and consistency of the battery module. After further research, it was found that a way of spreading the thermally conductive slurry on the cooling component and then placing the battery module on the thermally conductive slurry to press the conductive slurry will cause a gap between the battery module and the thermally conductive slurry or between the cooling component and the thermally conductive slurry. This is because there is a difference in a surface flatness of the surface of the battery module or the surface of the cooling component and thus undulating areas appear on surfaces of both the battery module and the cooling component. Thus during the pressing process of the thermally conductive slurry, it cannot be ensured that there is sufficient contact between the battery module and the thermally conductive slurry or between the cooling component and the thermally conductive slurry.

Based on the above problem found by the applicant, the applicant improves the structure of the battery module, and embodiments of the present disclosure are further described below.

Referring to FIGS. 3 to 6, the battery module assembly includes a battery module 20. The battery module 20 includes a battery unit 30 and a housing 40. The battery unit 30 is accommodated in the housing 40. The battery unit 30 includes a plurality of secondary batteries 30 and a bus bar 32 connecting different secondary batteries 30 in series or in parallel. The plurality of secondary batteries 30 are arranged side by side in one direction. The housing 40 includes a limit frame 50 and an injection channel 200 disposed on the limit frame 50. The limit frame 50 encloses the battery unit 30 inside the limit frame 50. The battery unit 30 has a top surface, a bottom surface, and a side surface connecting the top surface and bottom surface. The limit frame 50 is disposed around a side surface of the battery unit 30. The battery module assembly also includes a cooling component 400. The bottom surface of the battery unit 30 is disposed toward the cooling component 400. When the battery module 20 is applied to the battery module assembly, the battery module 20 may be pre-assembled with the cooling component 400 and an accommodation cavity 500 is formed between a bottom of the battery module 20 and the cooling component 400. The injection channel 200 provided on the limit frame 50 is communicated with the accommodation cavity 500. Then, the thermally conductive slurry is injected into the accommodation cavity 500 via the injection channel 200 on the limit frame 50. Since the thermally conductive slurry is injected into the accommodation cavity 500 via the injection channel 200, the thermally conductive slurry can effectively fill each area of the accommodation cavity 500 under an action of an injection pressure. Therefore, on one hand, it can be ensured that the bottom surface of the battery module 20 and the surface of the cooling component 400 keep in contact with the thermally conductive slurry, which reduces a possibility of a gap appearing between the battery module 20 and the thermally conductive slurry or between the cooling component 400 and the thermally conductive slurry. It is beneficial to improve a heat dissipation effect and a heat dissipation efficiency of the battery module 20. On the other hand, an accuracy requirement for the flatness of the bottom surface of the battery module 20 and the flatness of the surface of the cooling component 400 are low. The bottom surface of the battery module 20 and the surface of the cooling component 400 are allowed to have undulations, so as to reduce processing requirements of the bottom of the battery module 20 and the cooling component 400, and reduce the processing difficulty and cost.

In one embodiment, the battery module assembly includes the cooling component 400 and the plurality of battery modules 20 disposed above the cooling component 400. In this embodiment, by arranging the injection channel 200 on the limit frame 50 of the battery module 20, the thermally conductive slurry can be injected into the accommodation cavity 500 between each battery module 20 and the cooling component 400 independently, so that the cooling component 400 and the box will not to be destroyed and structural integrity of each of the cooling component 400 and the box 11 is ensured. If the injection channel 200 is not provided on the limit frame 50, after the battery module assembly is put into the box 11 and assembled to form a battery pack, the injection channel 200 needs to be provided on each of the cooling component 400 and the box 11 at the same time for injecting the thermally conductive slurry in to the accommodation cavity 500 formed between the battery module 20 and the cooling component 400. However, providing the injection channel 200 on the box 11 may affect the overall airtightness of the battery pack 10.

Figure 3:
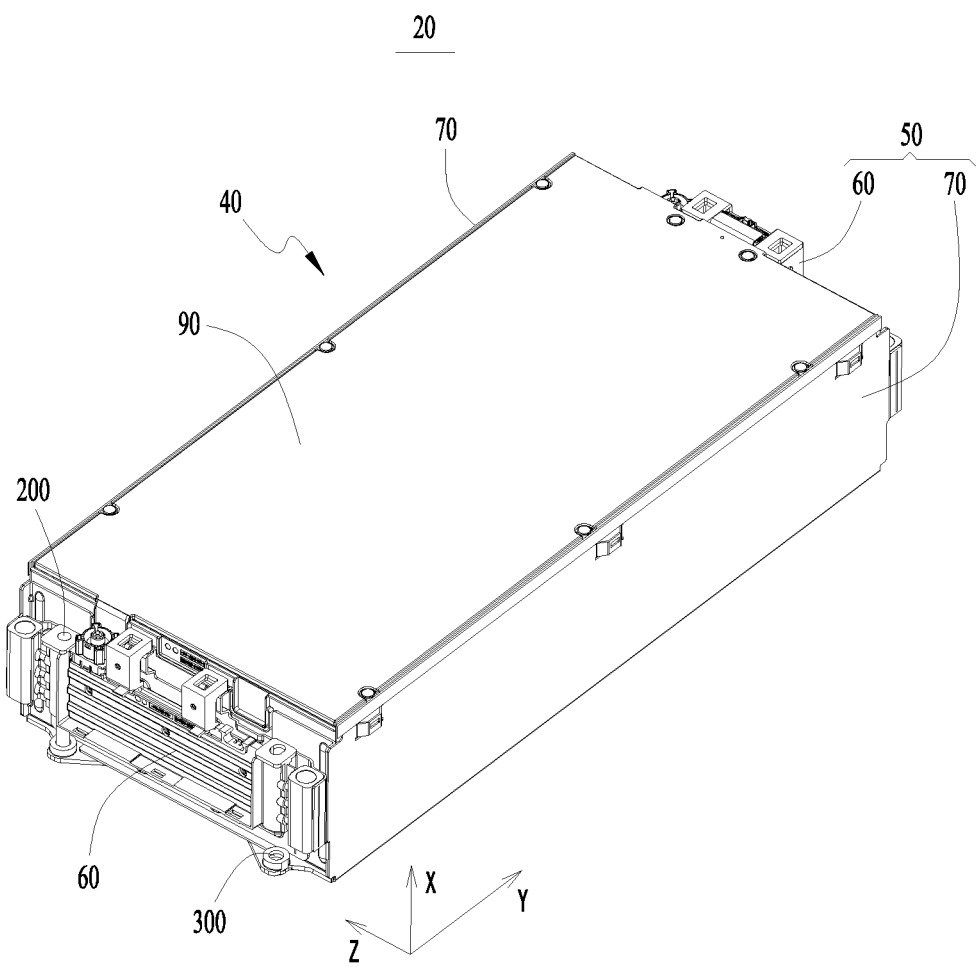
FIG. 3 is a schematic structural diagram of a battery module disclosed in an embodiment of the present disclosure.
Figure 4:
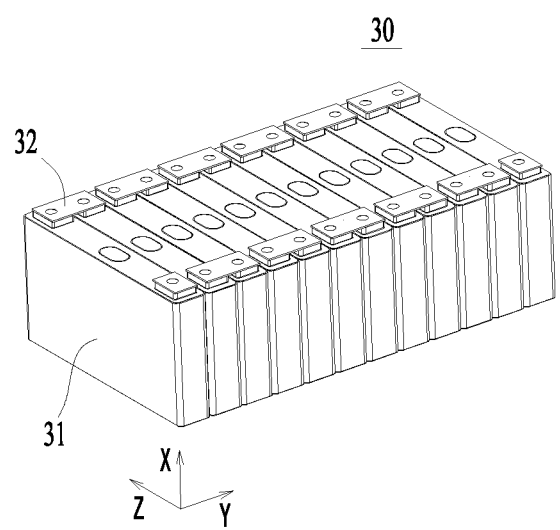
FIG. 4 is a schematic diagram of a partial structure of a battery module disclosed in an embodiment of the present disclosure.
Figure 5:
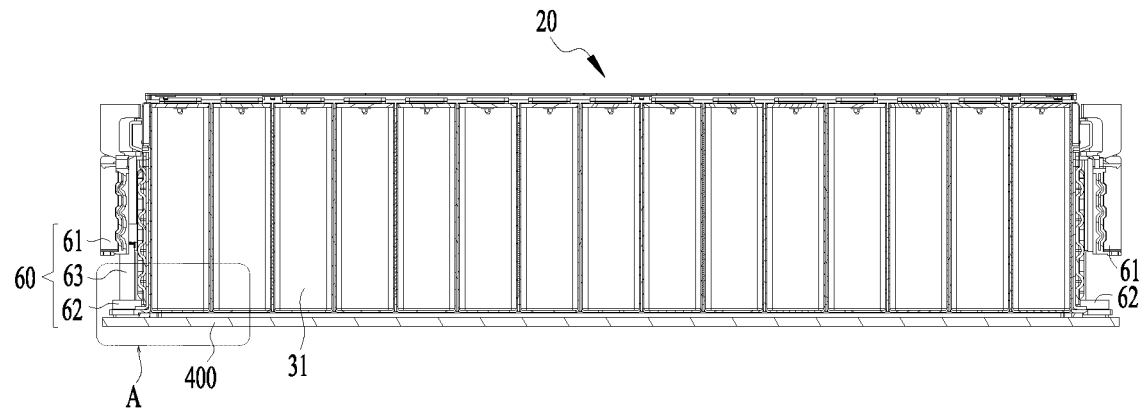
FIG. 5 is a schematic diagram of a partial cross-sectional structure of a battery module assembly disclosed in an embodiment of the present disclosure.

Referring to FIG. 4, the battery unit 30 of the embodiment of the present disclosure has a predetermined height, length and width. The height direction X of the battery unit 30 is perpendicular to an arrangement direction of the secondary batteries. The length direction Y of the battery unit 30 is the same as the arrangement direction of the secondary batteries. The width direction Z of the battery unit 30 is perpendicular to both the height direction X and the length direction Y Referring to FIG. 3, the injection channel 200 penetrates the limit frame 50 along the height direction X of the battery unit 30. An injection device can be conveniently moved to a top of the battery module 20 and aligned with the injection channel 200 along the height direction X, which is beneficial to reduce the difficulty of aligning the injection device with the injection channel 200. After the thermally conductive slurry is injected into the injection channel 200, the thermally conductive slurry flows toward the accommodation cavity 500 under an action of its own gravity combined with injection pressure, which is beneficial to improve fluidity of the thermally conductive slurry, reduce a possibility of retention of the thermally conductive slurry in the injection channel 200, and improve efficiency of injection work.

In one embodiment, as shown in FIG. 4, the limit frame 50 includes an end plate assembly 60 and a side plate assembly 70. The end plate assembly 60 and the side plate assembly 70 are connected to each other and alternately arranged around the battery unit 30. The battery unit 30 has two ends opposite to each other in the length direction Y of the battery unit 30. The end plate assembly 60 is disposed at the end of the battery unit 30. The two side plate assemblies 70 are oppositely disposed on two sides of the battery unit 30 along the width direction Z of the battery unit 30.

In one embodiment, the injection channel 200 is provided in the side plate assembly 70. In the height direction X, the injection channel 200 penetrates the side plate assembly 70.

In one embodiment, as shown in FIG. 3, the injection channel 200 is provided in the end plate assembly 60. A structural feature, such as a reinforcing portion, is usually provided on the end plate assembly 60. The injection channel 200 disposed on the end plate assembly 60 can be processed and manufactured together with corresponding structural features, and the processing technology is simple. At the same time, the injection channel 200 disposed on the corresponding structural features will not occupy additional space, which is beneficial to improve an energy density of the battery module 20. In addition, since the injection channel 200 is disposed in the end plate assembly 60, the thickness of the side plate assembly 70 can be reduced, which is beneficial to improve the energy density of the battery module 20. In the battery pack 10, two or more battery modules 20 are arranged side by side. The respective side plate assemblies 70 in two adjacent battery modules 20 are arranged adjacently, and the end plate assemblies 60 are arranged side by side along the width direction Z, so that a distance between the injection channels 200 on respective end plate assemblies 60 is relatively large. In this way, when the injection channel 200 is arranged on the end plate assembly 60, it is convenient for the injection devices to inject the thermally conductive slurry into the plurality of battery modules 20 at the same time, and a positional interference of two adjacent injection devices does not occur, which improves the convenience and efficiency of the injection.

Figure 7:
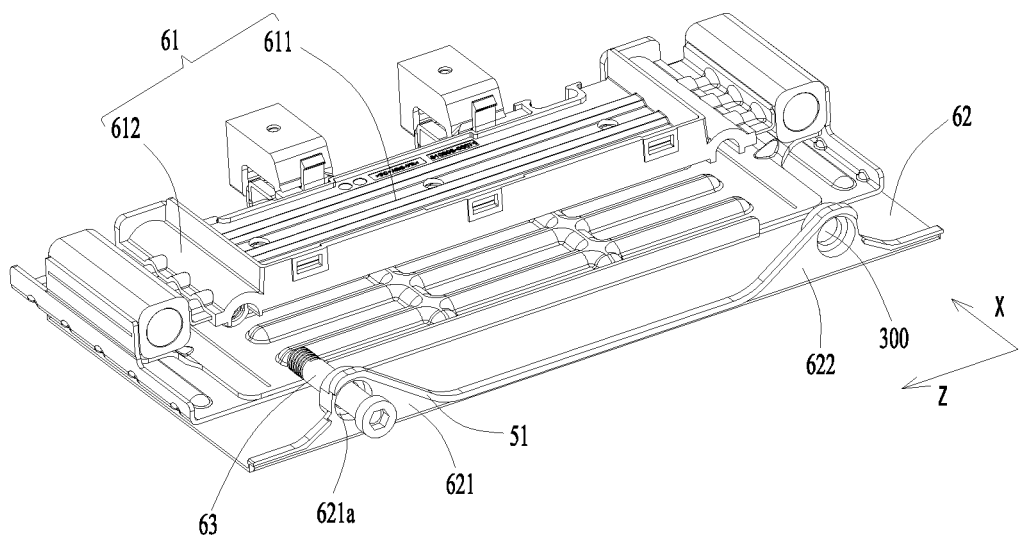
FIG. 7 is a schematic diagram of an exploded structure of a battery module disclosed in an embodiment of the present disclosure.
Figure 8:
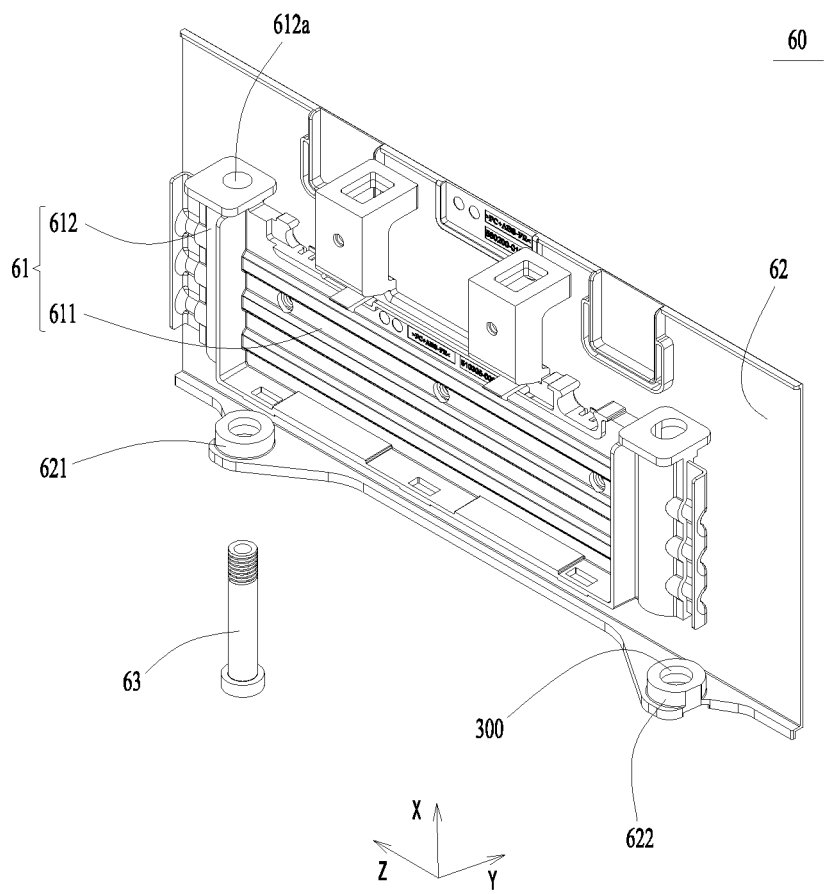
FIG. 8 is a schematic diagram of an exploded structure of an end plate assembly disclosed in an embodiment of the present disclosure.

In one embodiment, as shown in FIGS. 3, 7 and 8 together, the end plate assembly 60 includes an end plate 61 and an insulation plate 62. At least part of the insulation plate 62 is disposed between the end plate 61 and the battery unit 30 for isolating the end plate 61 and the battery unit 30. The end plate 61 of the end plate assembly 60 is used for connecting with the side plate assembly 70. The material of the end plate 61 may be aluminum, aluminum alloy or steel. The injection channel 200 penetrates both the end plate 61 and the insulation plate 62. In one example, a portion of the insulation plate 62 is disposed between the end plate 61 and the battery unit 30, and a portion thereof is located below the end plate 61 and serves to isolate the end plate 61 from the cooling component 400.

In one embodiment, as shown in FIG. 3, FIG. 7 and FIG. 8 together, the end plate assembly 60 further includes a connection pipe 63. Ends of the connection pipe 63 are connected to the end plate 61 and the insulation plate 62, respectively. The injection channel 200 penetrates the end plate 61, the connection pipe 63 and the insulation plate 62. The connection pipe 63 has two ends opposite in the height direction X. One end of the connection pipe 63 is connected to the end plate 61, and the other end is connected to the insulation plate 62. Since the end plate 61 and the insulation plate 62 are manufactured separately, it is necessary to make a through hole in the end plate 61 to form a part of the injection channel 200 and a through hole in the insulation plate 62 to form a part of the injection channel 200. In this embodiment, when the end plate 61 is connected to the insulation plate 62 via the connection pipe 63, the connection pipe 63 can compensate for a position error of each of the through hole on the end plate 61 and the through hole on the insulation plate 62, thereby reducing a positional accuracy requirement for manufacturing through holes on the end plate 61 and the insulation plate 62.

In one embodiment, as shown in FIGS. 7 and 8, the end plate 61 has a body portion 611 and a first adapter portion 612. The first adapter portion 612 is disposed on a side of the body portion 611 away from the battery unit 30. At least part of the insulation plate 62 is disposed between the body portion 611 and the battery unit 30. A through hole is machined on the first adapter portion 612 to form a part of the injection channel 200. The connection pipe 63 is detachably connected to the first adapter portion 612. Optionally, one end of the connection pipe 63 is threadedly connected with the first adapter portion 612 or one end of the connection pipe 63 is in interference fit with the through hole on the first adapter portion 612. Optionally, one end of the connection pipe 63 is connected to the first adapter portion 612 in a sealed manner, which reduces a possibility that the thermally conductive slurry overflows from a connection between one end of the connection pipe 63 and the first adapter portion 612. In one example, the first adapter portion 612 is disposed protruding from the body portion 611 and has a strip-shaped structure extending along the height direction X. The through hole on the first adapter portion 612 extends along the height direction X. In this way, the thickness of the body portion 611 can be reduced, which is beneficial to reduce the overall weight of the end plate assembly 60 and improve the energy density of the secondary battery.

Figure 9:
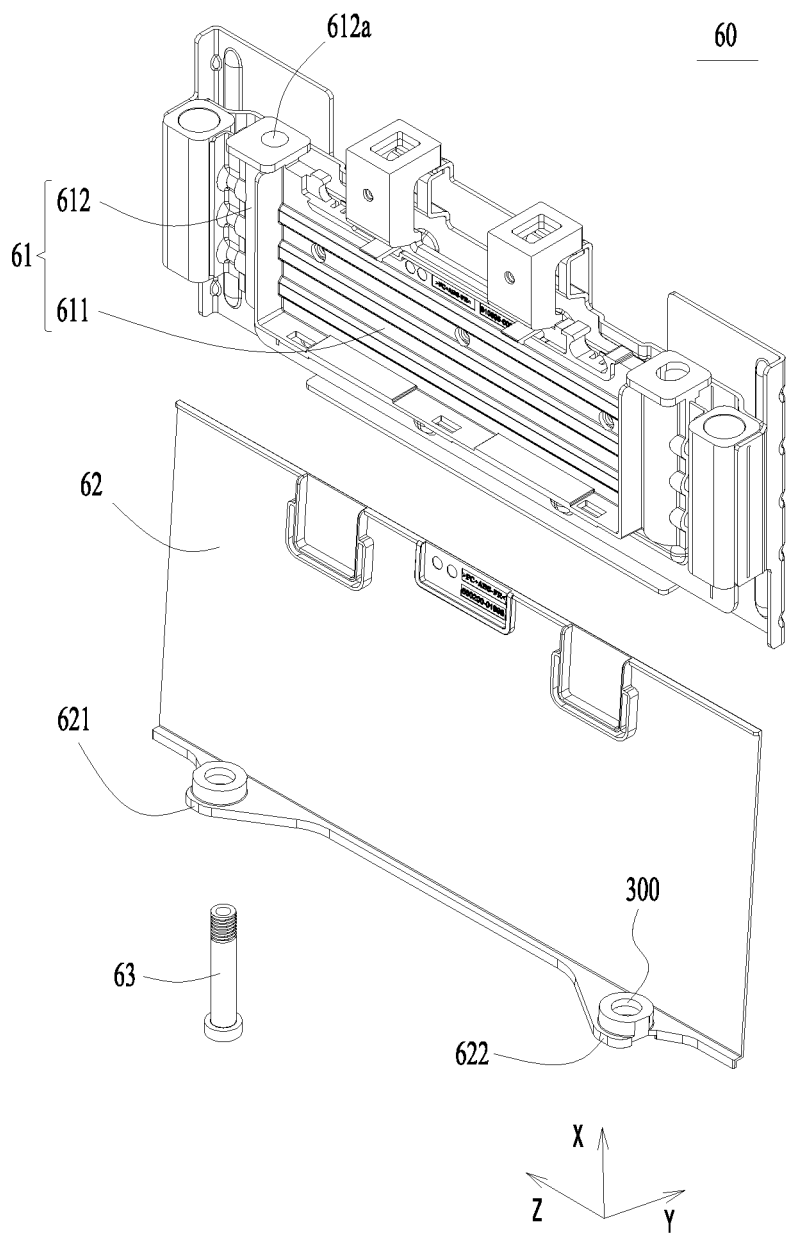
FIG. 9 is a schematic diagram of an exploded structure of an end plate assembly disclosed in an embodiment of the present disclosure.

In one embodiment, as shown in FIGS. 8 and 9, the insulation plate 62 includes a second adapter portion 621. The second adapter portion 621 is disposed on a side of the insulation plate 62 away from the battery unit 30. A portion of the insulation plate 62 beyond the body portion 611 forms the second transition portion 621. One end of the connection pipe 63 is connected to the second adapter portion 621. The injection channel 200 penetrates the end plate 61, the connection pipe 63 and the second adapter portion 621. Optionally, one end of the connection pipe 63 is connected with the second adapter 621 in a sealed manner to reduce a possibility that the thermally conductive slurry overflows from a connection between one end of the connection pipe 63 and the second adapter portion 621. Optionally, the first adapter portion 612 and the second adapter portion 621 are disposed correspondingly along the height direction X. The through hole on the first adapter portion 612 and the through hole on the second adapter portion 621 are disposed correspondingly along the height direction X. In one example, the second adapter portion 621 has a receiving portion. One end of the connection pipe 63 is accommodated in the receiving portion. In this way, on the one hand, one end of the connection pipe 63 is less likely to interfere with an adjacent structural member, reducing a possibility that the connection pipe 63 is blocked by the adjacent structural member which results in poor flow of the thermally conductive slurry. On the other hand, the insulation plate 62 can limit a movement of the connection pipe 63 along its own radial direction, so as to reduce a possibility of loosening due to frequent friction between the connection pipe 63 and the insulation plate 62. Optionally, one end of the connection pipe 63 received in the receiving portion matches of the receiving portion in shape. One end of the connection pipe 63 received in the receiving portion has an inner polygonal hole, which is convenient for inserting a tool into the inner polygonal hole and screwing the connection pipe 63.

In one embodiment, as shown in FIGS. 3 and 7 together, the housing 40 further includes a discharge channel 300. The discharge channel 300 is configured to be communicated with the accommodation cavity 500 for discharging the thermally conductive slurry injected into the accommodation cavity 500. During the injection of the thermally conductive slurry, as the thermally conductive slurry is continuously injected, air remaining in the accommodation cavity 500 can be discharged via the discharge channel 300, so that the thermally conductive slurry can fully fill the accommodation cavity 500 and reduce a possibility that bubbles formed in the thermally conductive slurry affect the thermally conductive efficiency. In addition, the discharge channel 300 may serve as a viewing site. An operator can judge whether the accommodation cavity 500 is fully filled with the thermally conductive slurry by whether the thermally conductive slurry overflows from the discharge channel 300. After the accommodation cavity 500 is fully filled with the thermally conductive slurry, the thermally conductive slurry can overflow from the discharge channel 300, and an injection operation is stopped at this time, thereby reducing unnecessary waste caused by excessive use of the thermally conductive slurry. In one example, the insulation plate 62 includes a protrusion 622. The protrusion 622 is disposed on a side of the insulation plate 62 away from the battery unit 30. The discharge channel 300 penetrates the protrusion 622 in the height direction X of the battery unit 30. A discharge port of the discharge channel 300 is located on an upper surface of the protrusion 622 and is higher than the accommodation cavity 500, so as to ensure that the thermally conductive slurry will not overflow from the discharge channel 300 until the accommodation cavity 500 is fully filled with the thermally conductive slurry. Along the width direction Z of the battery unit 30, the second adapter portion 621 and the protrusion 622 are spaced apart, thereby increasing a distance between the injection channel 200 and the discharge channel 300. In this way, it is possible to reduce a possibility that the thermally conductive slurry injected from the injection channel 200 is discharged from the discharge channel 300 before the accommodation cavity 500 is fully filled which will cause a misjudgment by the operator.

Figure 6:
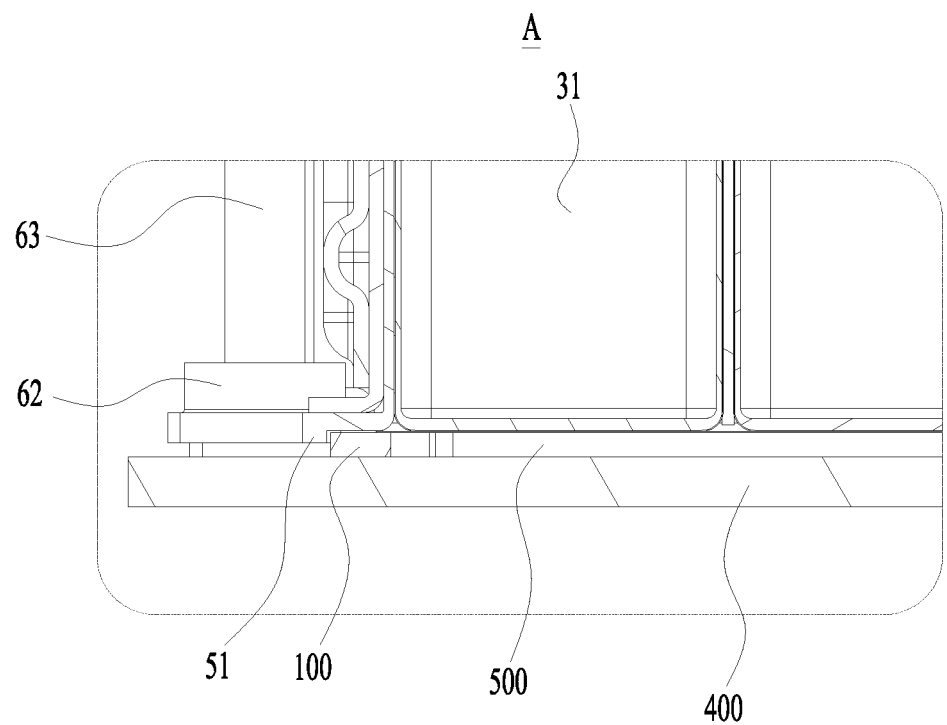
FIG. 6 is an enlarged view of A part in FIG. 5.
Figure 10:
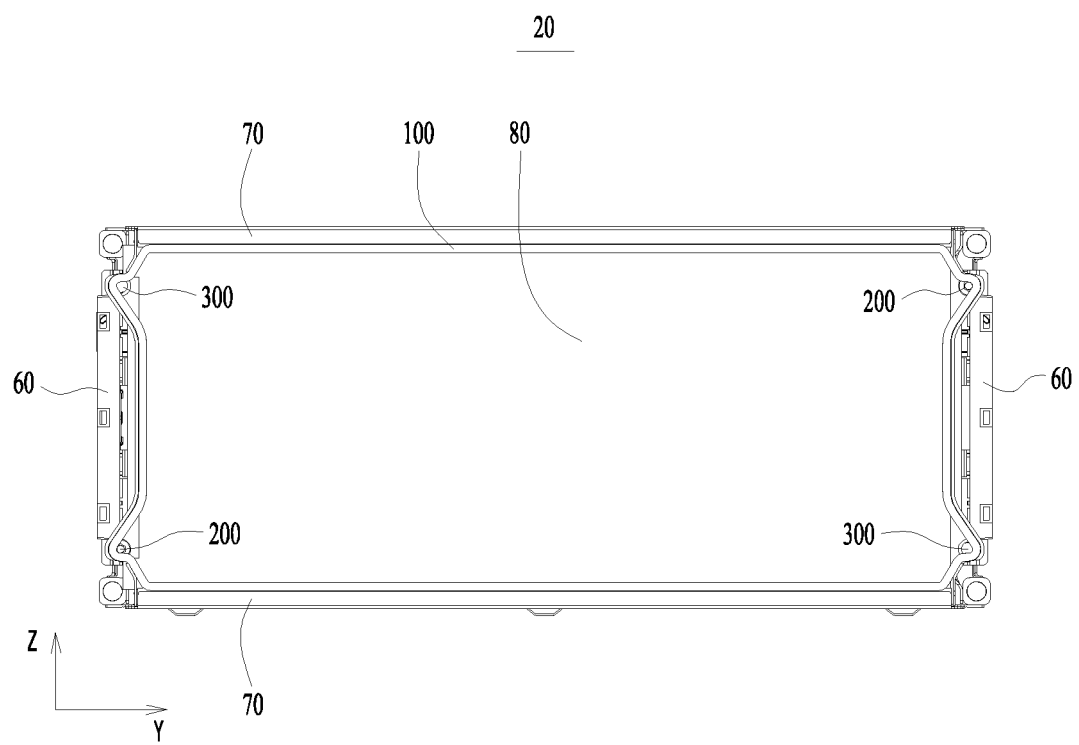
FIG. 10 is a schematic structural bottom diagram of an end plate assembly disclosed in an embodiment of the present disclosure.

In one embodiment, as shown in FIGS. 6 and 10, the battery module 20 further includes a blocking member 100. The blocking member 100 is disposed on the housing 40. The housing 40, the blocking member 100 and the cooling component 400 are configured to form the accommodation cavity 500. After the battery module 20 is assembled with the cooling component, in the height direction X, the blocking member 100 is located between the housing 40 and the cooling component 400. The blocking member 100 is arranged around the bottom of the housing 40 in a closed form. The blocking member 100 can block the thermally conductive slurry, reduce the possibility that the thermally conductive slurry injected into the accommodation cavity 500 overflows from the accommodation cavity 500 to the outside, improve the utilization rate of the thermally conductive slurry, and reduce unnecessary waste caused by excessive use of the thermally conductive slurry. In one example, the blocking member 100 has an integrally formed annular structure. The blocking member 100 also has a flexible structure and itself has elastic deformation ability. The housing 40 and the cooling component 400 can jointly apply a pressing stress to the blocking member 100, so as to further improve the sealing between the blocking member 100 and the housing 40 and between the blocking member 100 and the cooling component 400. Optionally, the material of the blocking member 100 may be rubber or silicone.

In one embodiment, as shown in FIG. 6 and FIG. 7, the limit frame 50 is provided with a boss 51. The blocking member 100 is located inside the boss 51, and an opening of the injection channel 200 and an opening of the discharge channel 300 are located inside the blocking member 100. The boss 51 is used to limit a position of the blocking member 100. The boss 51 can form a constraining limit for the blocking member 100 from the outside of the blocking member 100, so as to reduce a possibility that the blocking member 100 itself is expanded outward due to pressing stress and is offset in position. In one example, a surface of the insulation plate 62 away from the end plate 61 is provided with the boss 51.

In one embodiment, as shown in FIG. 10, the housing 40 further includes a bottom plate 80. The battery unit 30 is disposed on and supported by the bottom plate 80. The blocking member 100 is disposed on a side of the bottom plate 80 away from the battery unit 30. The bottom plate 80, the blocking member 100 and the cooling component 400 form the accommodation cavity 500. The bottom plate 80 is connected fixedly to the limit frame 50. In another embodiment, as shown in FIG. 3, the housing 40 further includes a top plate 90. The top plate 90 is connected fixedly with the limit frame 50, so that the top plate 90, the bottom plate 80 and the limit frame 50 enclose the battery unit 30.

Referring to FIG. 3 and FIG. 6, an embodiment of the present disclosure provides a battery module assembly, which includes the cooling component 400 and the battery module 20.

In the height direction X, the cooling component 400 is disposed below the battery module 20. The cooling component 400 is used to cool the battery module 20. The accommodation cavity 500 is provided between the bottom of the battery module 20 and the cooling component 400. The injection channel 200 is communicated with the accommodation cavity 500. The injection channel 200 is used to inject the thermally conductive slurry into the accommodation cavity 500.

The heat of the battery module 20 may be conducted to the cooling component 400 via the thermally conductive slurry. Since the thermally conductive slurry is injected into the accommodation cavity 500 via the injection channel 200 on the limiting frame 50, it can be ensured that the accommodation cavity 500 is fully filled with the thermally conductive slurry under the condition that each of the bottom surface of the battery module 20 and the surface of the cooling component 400 has a difference in flatness. Therefore, it is difficult to leave a gap between the battery module 20 and the thermally conductive slurry and between the cooling component 400 and the thermally conductive slurry, but instead they are in a good contact state, thereby ensuring a good heat dissipation effect of the battery module assembly itself.

An embodiment of the present disclosure provides a production method for a battery module assembly, which includes:

providing the cooling component 400;

providing the battery module 20, wherein the battery module 20 includes the battery unit 30 and the housing 40, the housing 40 accommodates the battery unit 30 and includes the limit frame 50 and the injection channel 200 disposed on the limit frame 50, and the limit frame 50 is arranged around the battery unit 30;

connecting the battery module 20 to the cooling component 400, forming the accommodation cavity 500 between the bottom of the battery module 20 and the cooling component 400, wherein the injection channel 200 is communicated with the accommodation cavity 500;

injecting the thermally conductive slurry into the accommodation cavity 500 via the injection channel 200.

In the production method for the battery module assembly of the embodiment of the present disclosure, the accommodation cavity 500 formed between the battery module 20 and the cooling component 400 can be fully filled with the thermally conductive slurry via the injection channel 200, so that a good contact state is kept between the battery module 20 and the thermally conductive slurry and between the cooling component 400 and the thermally conductive slurry and thus the battery module assembly itself is ensured to have a good heat dissipation effect.

While the present disclosure has been described with reference to the preferred embodiments, various modifications may be made and equivalents may be substituted for parts thereof without departing from the scope of the present application. In particular, as long as there is no structural conflict, each technical feature mentioned in each embodiment can be combined in any manner. The present disclosure is not limited to the specific embodiments disclosed herein, but includes all technical solutions falling within the scope of the claims.

What is claimed is:

1. A battery module, comprising:
   a battery unit comprising a top surface, a bottom surface, and a side surface connecting the top surface and the bottom surface;
   a housing for accommodating the battery unit, wherein the housing comprises a limit frame and an injection channel arranged on the limit frame, the limit frame is arranged around the side surface of the battery unit; an accommodation cavity is formed by a bottom of the battery module and a cooling component, and the injection channel is configured to be communicated with the accommodation cavity to allow for an injection of thermally conductive slurry into the accommodation cavity from the injection channel, wherein the limit frame comprises an end plate assembly provided at an end of the battery unit, and the injection channel is provided in the end plate assembly; and the end plate assembly comprises an end plate, an insulation plate, and a connection pipe, at least part of the insulation plate is provided between the end plate and the battery unit, two ends of the connection pipe are connected to the end plate and the insulation plate respectively, and the injection channel penetrates the end plate, the connection pipe and the insulation plate.

2. The battery module of claim 1, wherein the injection channel penetrates the limit frame along a height direction of the battery unit.

3. The battery module according to claim 1, wherein the end plate comprises a body portion and a first adapter portion provided on a side of the body portion away from the battery unit, and the connection pipe is detachably connected to the first adapter portion.

4. The battery module according to claim 1, wherein the insulation plate comprises a second adapter portion provided on a side of the insulation plate away from the battery unit, one end of the connection pipe is connected to the second adapter portion, and the injection channel penetrates the end plate, the connection pipe and the second adapter portion.

5. The battery module according to claim 4, wherein the second adapter portion comprises a receiving portion, and one end of the connection pipe is received in the receiving portion.

6. The battery module of claim 1, wherein the housing further comprises a discharge channel configured to be communicated with the accommodation cavity to discharge the thermally conductive slurry injected into the accommodation cavity.

7. The battery module according to claim 1, wherein the insulation plate comprises a protrusion provided on a side of the insulation plate away from the battery unit, the housing comprises a discharge channel penetrating the protrusion in a height direction of the battery unit and configured to be communicated with the accommodation cavity.

8. The battery module according to claim 1, wherein the battery module further comprises a blocking member provided on the housing, and the accommodation cavity is formed by the housing, the blocking member and the cooling component.

9. The battery module of claim 8, wherein the blocking member has an annular flexible structure.

10. The battery module according to claim 8, wherein the limit frame is provided with a boss, the blocking member is located inside the boss, and the boss is used to limit a position of the blocking member.

11. The battery module according to claim 3, wherein the insulation plate comprises a second adapter portion provided on a side of the insulation plate away from the battery unit, one end of the connection pipe is connected to the second adapter portion, and the injection channel penetrates the end plate, the connection pipe and the second adapter portion.

12. The battery module according to claim 11, wherein the second adapter portion comprises a receiving portion, and one end of the connection pipe is received in the receiving portion.

13. The battery module according to claim 4, wherein the insulation plate comprises a protrusion provided on a side of the insulation plate away from the battery unit, the housing comprises a discharge channel penetrating the protrusion in a height direction of the battery unit and configured to be communicated with the accommodation cavity.

14. The battery module according to claim 11, wherein the insulation plate comprises a protrusion provided on a side of the insulation plate away from the battery unit, the housing comprises a discharge channel penetrating the protrusion in a height direction of the battery unit and configured to be communicated with the accommodation cavity.

15. A battery module assembly, comprising:
a cooling component;
the battery module according to claim 1, wherein the battery module is connected to the cooling component, the accommodation cavity is provided between the bottom of the battery module and the cooling component, the injection channel is communicated with the accommodation cavity and used for injecting the thermally conductive slurry into the accommodation cavity, and the thermally conductive slurry is used for conducting heat of the battery module to the cooling component.

16. A production method for a battery module assembly, comprising:
providing a cooling component;
providing a battery module, wherein the battery module comprises a battery unit and a housing, the battery unit comprises a top surface, a bottom surface, and a side surface connecting the top surface and the bottom surface; the housing accommodates the battery unit, the housing comprises a limit frame and an injection channel arranged on the limit frame, and the limit frame is arranged around the side surface of the battery unit; the limit frame comprises an end plate assembly provided at an end of the battery unit, and the injection channel is provided in the end plate assembly: the end plate assembly comprises an end plate, an insulation plate, and a connection pipe, at least part of the insulation plate is provided between the end plate and the battery unit, two ends of the connection pipe are connected to the end plate and the insulation plate respectively, and the injection channel penetrates the end plate, the connection pipe, and the insulation plate:
connecting the battery module to the cooling component, forming an accommodation cavity between a bottom of the battery module and the cooling component, wherein the injection channel is communicated with the accommodation cavity;
injecting the thermally conductive slurry into the accommodation cavity via the injection channel.

17. An apparatus using a battery module as a power source, comprising the battery module according to claim 1.

* * * * *